US012692836B2

(12) United States Patent
Shang et al.

(10) Patent No.: US 12,692,836 B2
(45) Date of Patent: Jul. 28, 2026

(54) LOW-SPEED HIGH-TORQUE HYDROSTATIC POWERTRAIN

(71) Applicant: Purdue Research Foundation, West Lafayette, IN (US)

(72) Inventors: Lizhi Shang, West Lafayette, IN (US); Jun Chen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 496 days.

(21) Appl. No.: 17/877,913

(22) Filed: Jul. 30, 2022

(65) Prior Publication Data

US 2023/0030035 A1 Feb. 2, 2023

Related U.S. Application Data

(60) Provisional application No. 63/228,232, filed on Aug. 2, 2021.

(51) Int. Cl.

*F03D 9/28* (2016.01)
*F03D 15/00* (2016.01)
*F03D 15/10* (2016.01)

(52) U.S. Cl.

CPC ............... *F03D 9/28* (2016.05); *F03D 15/00* (2016.05); *F03D 15/10* (2016.05); (Continued)

(58) Field of Classification Search

CPC . F03D 9/28; F03D 15/00; F03D 15/10; F05B 2260/406; F05B 2260/506; Y02E 10/72
See application file for complete search history.

(56) References Cited

U.S. PATENT DOCUMENTS 682,385 A * 9/1901 McFarland ........... F02B 75/265 123/42
2,766,702 A * 10/1956 McVittie .................. F03C 1/22 91/490

(Continued)

FOREIGN PATENT DOCUMENTS

JP 2014129774 * 7/2014 ............. Y02E 10/72
JP 2014129775 * 7/2014 ............. Y02E 10/72

OTHER PUBLICATIONS

Roggenburg et al., Techno-economic analysis of a hydraulic transmission for floating offshore wind turbines. Renewable Energy, 153, pp. 1194-1204, 2020.

(Continued)

*Primary Examiner* — Dustin T Nguyen
(74) *Attorney, Agent, or Firm* — Piroozi-IP, LLC

(57) ABSTRACT

A hydraulic pump is disclosed, which includes an input crank shaft configured to be interfaced with a shaft of a power generating device, one or more connecting rings coupled to the input crank shaft with an eccentric interface such that when the input crank shaft is rotating causes the connecting ring to rotate with an eccentricity, a fixed annular frame, and a plurality of hydraulic actuators annularly disposed between the one or more connecting rings and the fixed annular frame, each hydraulic actuator of the plurality of hydraulic actuators having a piston disposed within a cylinder and each further including a hydraulic input and a hydraulic output, the eccentricity between the connecting ring and the input crank shaft causes the plurality of hydraulic actuators to i) pump hydraulic fluid out of the hydraulic output, or ii) cause suction of hydraulic fluid from the hydraulic input.

14 Claims, 5 Drawing Sheets

(52) U.S. Cl.
CPC ... *F05B 2260/406* (2013.01); *F05B 2260/506* (2013.01); *Y02E 10/72* (2013.01)

(56) References Cited

U.S. PATENT DOCUMENTS

| | | | | | |
|---|---|---|---|---|---|
| 3,273,464 | A * | 9/1966 | Thurber | F03C 1/22 | 91/176 |
| 4,496,846 | A * | 1/1985 | Parkins | F03D 9/10 | 290/55 |
| 7,863,767 | B2 * | 1/2011 | Chapple | F03D 7/043 | 290/43 |
| 8,669,671 | B2 * | 3/2014 | Efraty | F03D 9/257 | 290/55 |
| 8,870,553 | B2 * | 10/2014 | Lavender | F04B 9/04 | 417/442 |
| 2010/0032959 | A1 * | 2/2010 | Nies | F03D 9/17 | 416/174 |
| 2013/0009612 | A1 * | 1/2013 | Caldwell | F03D 9/28 | 60/381 |
| 2013/0049371 | A1 * | 2/2013 | Stein | F03D 15/20 | 290/55 |
| 2013/0205763 | A1 * | 8/2013 | Caldwell | F04B 49/065 | 60/459 |
| 2013/0216403 | A1 * | 8/2013 | Salter | F04B 9/02 | 417/222.1 |
| 2013/0251499 | A1 * | 9/2013 | Rampen | F03D 15/00 | 415/1 |
| 2014/0070534 | A1 * | 3/2014 | Hamano | F03D 9/28 | 290/43 |

OTHER PUBLICATIONS

Williamson, Artemis intelligent power: winds of change, 2015.

Mortensen et al., Efficiency analysis of a radial piston pump applied in a 5MW wind turbine with hydraulic transmission. Aalborg University: Aalborg, Denmark, pp. 2-3, 2011.

Chen et al., Review of the application of hydraulic technology in wind turbine. Wind Energy, 23(7), pp. 1495-1522, 2020.

Mohanty et al., Experimental validation of a hydrostatic transmission for community wind turbines. Energies, 15(1), p. 376, 2022.

Laguna, Steady-state performance of the delft offshore turbine. Faculty of Aerospace Engineering, Delft University of Technology, Delft, M. Sc. Thesis, 2010.

Tao et al., Mechanical design and numerical simulation of digital-displacement radial piston pump for multi-megawatt wind turbine drivetrain. Renewable energy, 143, pp. 995-1009, 2019.

* cited by examiner

LOW-SPEED HIGH-TORQUE HYDROSTATIC POWERTRAIN

CROSS-REFERENCE TO RELATED APPLICATIONS

The present patent application is related to and claims the priority benefit of U.S. Provisional Patent Application Ser. No. 63/228,232 filed Aug. 2, 2021, the contents of which are hereby incorporated by reference in its entirety into the present disclosure.

STATEMENT REGARDING GOVERNMENT FUNDING

None.

TECHNICAL FIELD

The present disclosure generally relates to power transfer modules and in particular, to a Low-Speed High-Torque Hydrostatic Powertrain suitable for use with renewable energy applications such as wind and hydro turbines.

BACKGROUND

This section introduces aspects that may help facilitate a better understanding of the disclosure. Accordingly, these statements are to be read in this light and are not to be understood as admissions about what is or is not prior art.

Wind and hydro turbines are the most effective approach to harvest wind energy and marine and hydrokinetic (MHK) energy. In each of these applications some sort of powertrain is needed to transfer harvested energy into useful energy. Specifically, in the powertrain system, a form of transmission must be adopted to transmit energy from the turbine to an electric generator. The turbine usually features high-torque, low-speed. Its operating speed varies with the wind/water current speed. In contrast, the electric generator prefers high and constant speed. In fact, the speed ratio between the generator and the turbine can be above 100 to 1, thus necessitating at least three stages of gearbox. However, the overall efficiency of a multistage transmission is suboptimal. Additionally, the fixed transmission ratio of a conventional turbine gearbox also limits the generator efficiency.

The mainstream solution to reduce the torque and multiply the speed uses a multi-stage gearbox. Since the gear ratio of a gearbox is fixed, the generator must run at variable speed. Therefore, the electric power frequency is regulated electrically, further adding to reduced efficiency.

There are some attempts of using hydrostatic transmissions in wind turbine applications. The main obstacle in this approach include low efficiency, frequently required maintenance, and oil leakage, raising both maintenance and environmental concerns.

Therefore, there is an unmet need for a novel approach in renewable energy applications such as wind turbine and MHK energy harvesting to make the speed and torque requirements of the turbines compatible with electrical generators without sacrificing excessive efficiency.

SUMMARY

A low-speed high-torque hydrostatic powertrain is disclosed. The powertrain includes one or more hydraulic pumps. Each hydraulic pump includes an input crank shaft, one or more connecting rings coupled to the input crank shaft with an eccentric interface such that when the input crank shaft is rotating causes the one or more connecting rings to rotate with an eccentricity, a fixed annular frame, and a plurality of hydraulic actuators annularly disposed between the one or more connecting rings and the fixed annular frame, each hydraulic actuator of the plurality of hydraulic actuators having a piston disposed within a cylinder and each further including a hydraulic input and a hydraulic output. The eccentricity between the one or more connecting rings and the input crank shaft causes the plurality of hydraulic actuators to i) pump hydraulic fluid out of the hydraulic output, or ii) cause suction of hydraulic fluid from the hydraulic input. The powertrain further includes one or more hydraulic motors hydraulically coupled to the hydraulic outputs of the one or more hydraulic pumps. Additionally, the powertrain includes one or more generators coupled to the one or more hydraulic motors and configured to generate electrical power.

A hydraulic pump is also disclosed. The hydraulic pump includes an input crank shaft configured to be interfaced with a shaft of a power generating device, one or more connecting rings coupled to the input crank shaft with an eccentric interface such that when the input crank shaft is rotating causes the connecting ring to rotate with an eccentricity, a fixed annular frame, and a plurality of hydraulic actuators annularly disposed between the one or more connecting rings and the fixed annular frame. Each hydraulic actuator of the plurality of hydraulic actuators having a piston disposed within a cylinder and each further including a hydraulic input and a hydraulic output. The eccentricity between the connecting ring and the input crank shaft causes the plurality of hydraulic actuators to i) pump hydraulic fluid out of the hydraulic output, or ii) cause suction of hydraulic fluid from the hydraulic input.

DETAILED DESCRIPTION

Figure 1:
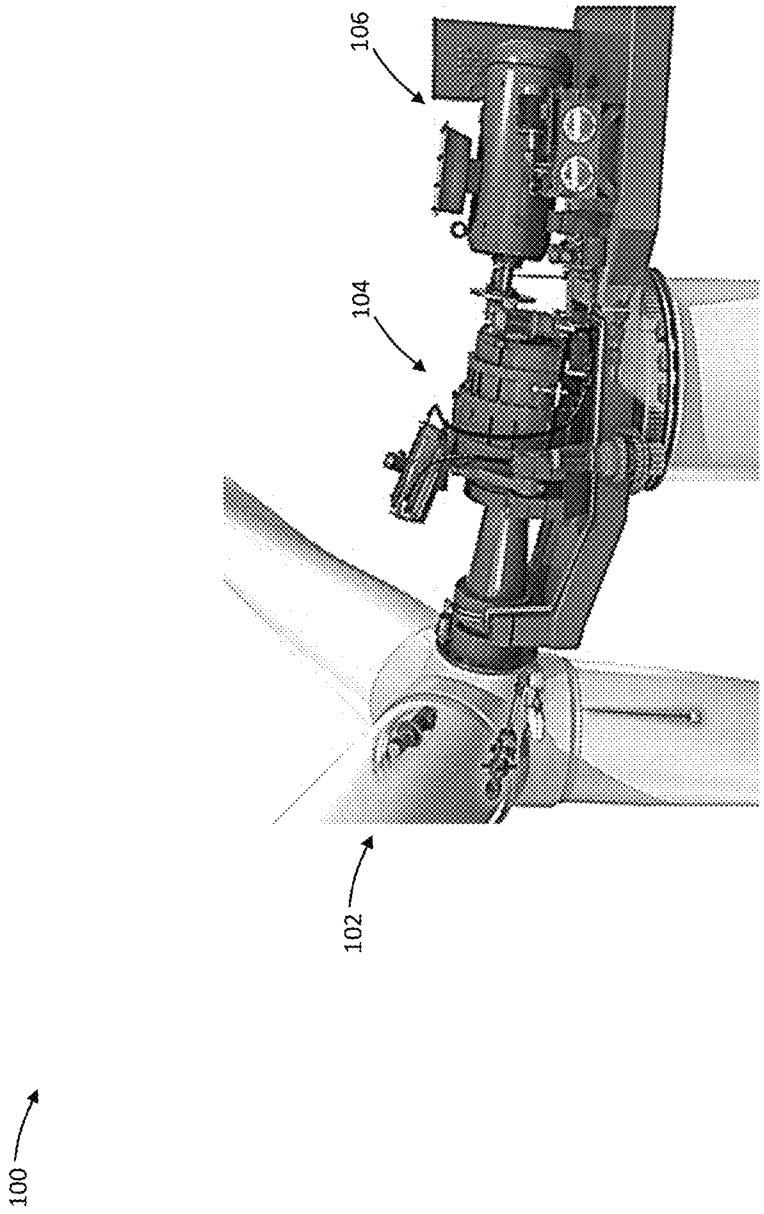
FIG. 1 is a schematic of a prior art arrangement for transferring power from a wind turbine to a generator.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach in renewable energy applications such as wind turbine and marine and hydrokinetic (MHK) energy harvesting is described herein to make the speed and torque requirements of the turbines compatible with electrical generators without sacrificing excessive efficiency. Towards this end, the present disclosure offers a solution for transmitting the power from a low-speed high torque turbine to the high-speed low torque generator while maintaining the constant generator speed, thereby providing an adaptive transmission ratio.

In comparison to the existing gearbox solution, the novel approach of the present disclosure allows for decoupling of the generator from the turbine. As such the generator can be placed on the ground level (or water surface level for MHK turbine), which reduces the nacelle weight of the turbine and simplifies maintenance of the generator as well as the turbine. Specifically, while a major benefit of decoupling the generator for wind turbine is to reduce the nacelle weight, for Marine and Hydrokinetic Technology (MHK) turbines such decoupling allows for maintaining the generator out of the water, resulting in less cost and added ease to maintain. Furthermore, the decoupling of the generator from the turbine allows for smart and collective energy harvesting using an array of individual turbines and one or more centralized generators. Turbines can be connected fluidly to their neighbor turbines. A common high-pressure fluid network can be established to connect multiple turbines and generators of a collective turbine array. The network allows for strategically selective operation of the generator, to keep some of the generators running at their most efficient points and shut down the rest to reserve lift time. Additionally, the decoupling of the turbine form the generator allows for generator speed regulation. In other words, the generator can maintain a constant speed suitable for electrical power generation (e.g., 60 Hz) without the need to further regulate the frequency of the alternating current (AC) which requires regulators that further reduce system efficiency.

Thus, comparing to the existing hydrostatic wind turbine powertrain, the novel approach of the present disclosure has a higher efficiency (up to 90%) owing to the novel working principle of a hydrostatic units, described below; can use water as the working fluid, thus leakage has less environmental damage, and provides ease of refilling in case of fluid loss; water is also a better working fluid for long-distance hydraulic power transmission, which enables distributed energy harvesting.

Referring to FIG. 1, the prior art approach to a power generation system 100 from a wind turbine 102 is shown. In the power generation system 100 shown in FIG. 1, the turbine 102 is coupled to a gearbox 104 which is coupled to a generator. This coupling between the turbine 102 and the generator 106 results in myriad issues including added nacelle weight vis-à-vis the gearbox 104 and the co-location of the generator 106, the requirement for an external electrical regulator as the speed of the generator 106 is unpredictable thus additionally resulting in reduced efficiency, and difficulty in maintaining both the gearbox 104 and the generator 106 being positioned at a high altitude in line with the centerline of the turbine 102.

Figure 2:
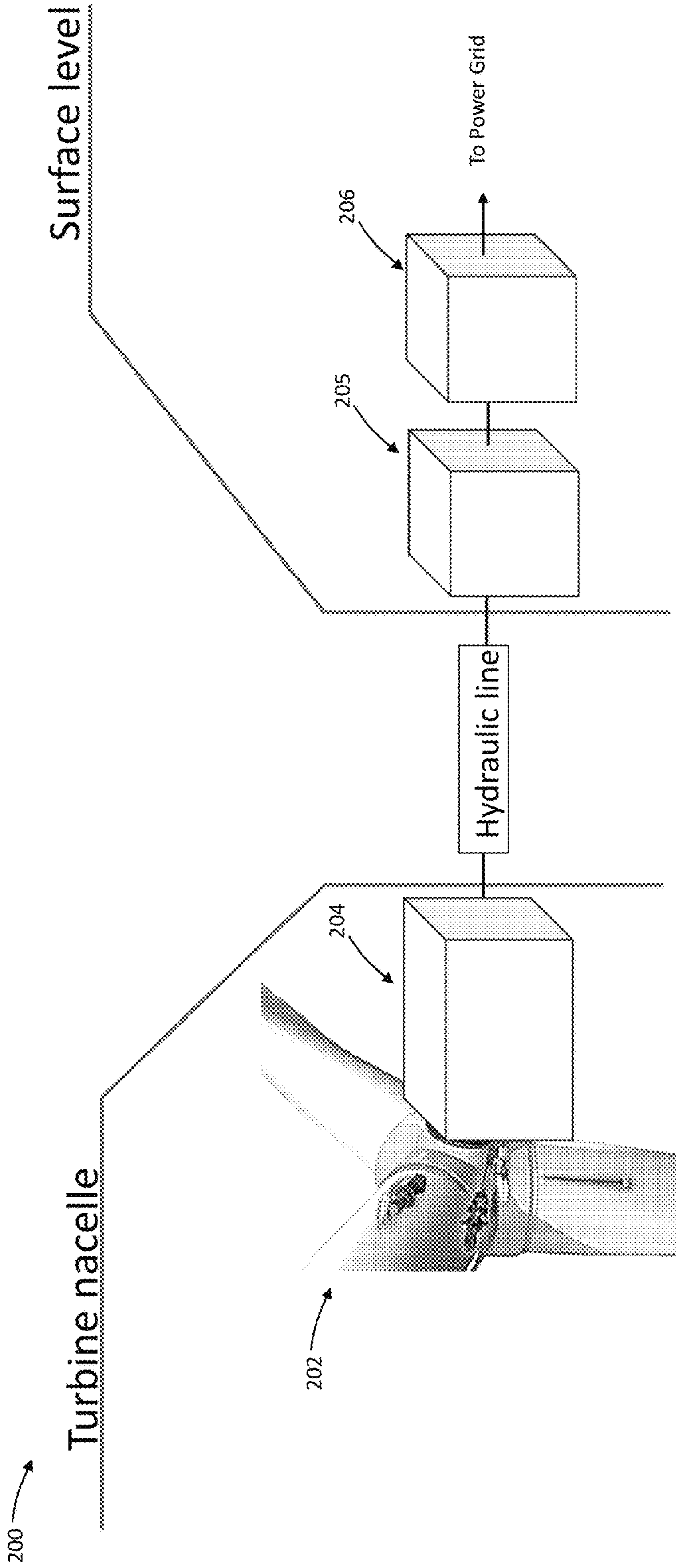
FIG. 2 is a high-level diagram depicting the novel arrangement of the present disclosure for a powertrain coupled to a wind turbine, the powertrain including a novel hydraulic pump.

Referring to FIG. 2, a high level concept schematic is provided depicting different components of a power generation system 200 according to the present disclosure. In order to make a substantial improvement based on the prior art's approach, the present disclosure describes a system wherein the gearbox 104 (see FIG. 1) is replaced with a hydraulic unit (including a hydraulic motor 205 and a hydraulic pump 204) and which transfer power to a generator 206 in a hydraulically decoupled manner, thus allowing the generator to be positioned in a suitable location (e.g., on the ground) to reduce the nacelle weight and further improve maintenance and more importantly efficiency as the system eliminates the need for electrical regulation of the generated power by the generator 206. The hydraulic motor is coupled to a turbine 202 (wind turbine or hydro turbine).

Figure 3:
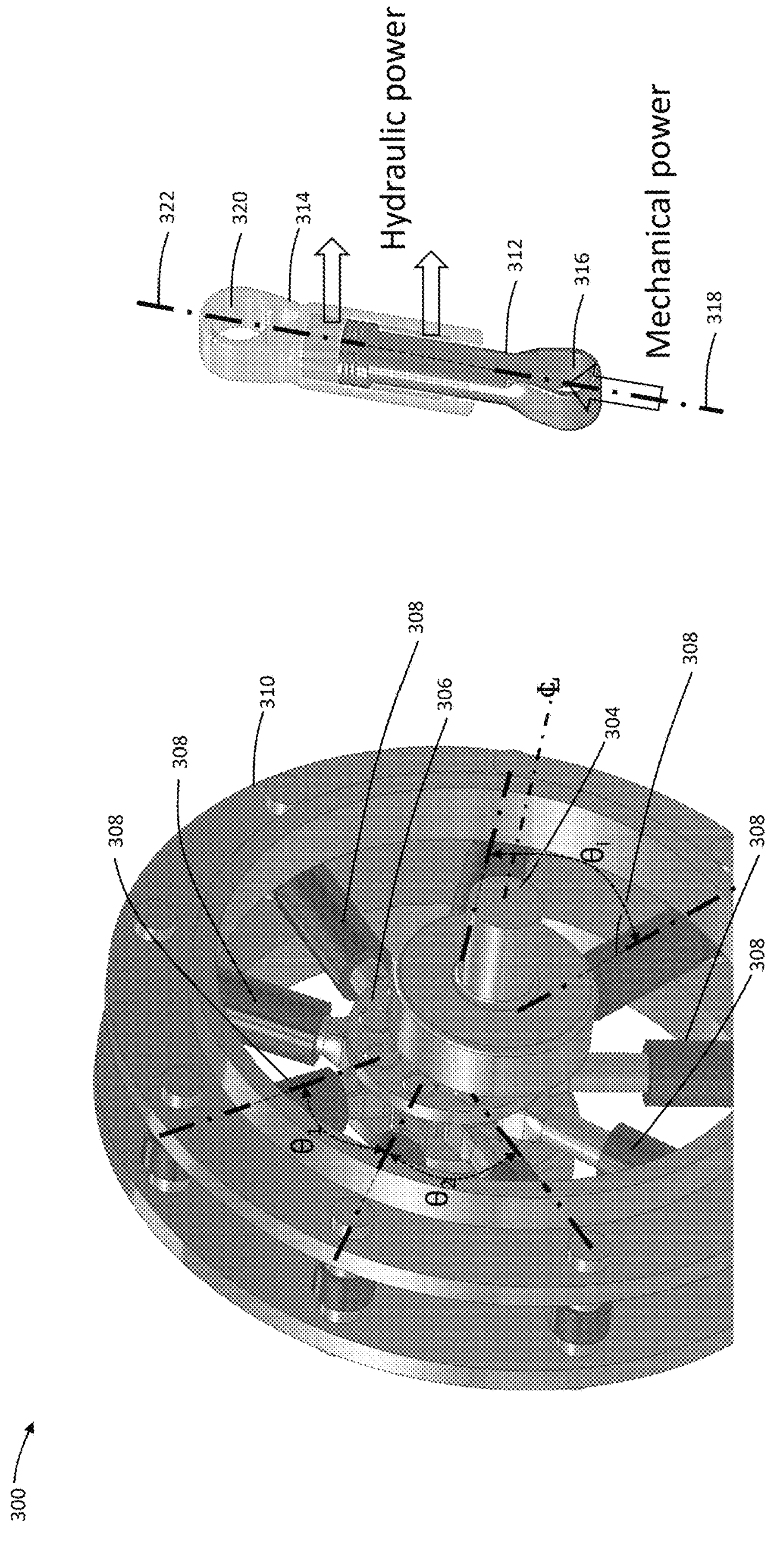
FIG. 3 is a schematic of the hydraulic pump shown in FIG. 2, comprising a plurality of hydraulic actuators, each having a piston-cylinder interface.

A novel hydraulic pump 300 is shown in FIG. 3 which can be used in coupling with the turbine. The hydraulic pump shown in FIG. 3 is co-located centrally with respect to the centerline (denoted as ℄) of the turbine. The hydraulic pump 300 of the present disclosure includes a crank shaft 304 eccentrically coupled to one or more connecting rings 306 with a distributed plurality of hydraulic actuators 308 coupled thereto each of the one or more connecting rings 306 and to an annular fixed frame 310. It should be appreciated that only one such connecting ring 306 is shown; however, more than one such connecting rings 306 can be coupled to the crank shaft 304 in a parallel manner extending between the crank shaft 304 and the annular fixed frame 310. Each hydraulic actuator 308 is in the form of a piston 312 within a cylinder 314, whereby mechanical force from the eccentric relationship between the crank shaft 304 and the connecting ring 306 as the crank shaft 304 rotates (the crank shaft is directly coupled to the turbine shaft, not shown) is translated from a coupling member at the base of the hydraulic actuator 308 to the piston 312 within the cylinder 314. In each hydraulic actuator, the piston 312 is pivotally connected to the one or more connecting rings 306 at a corresponding piston connecting region 316 aligned with a piston centerline 318 extending between the piston connecting region 316 and the piston 312 and each corresponding cylinder pivotally connected to the annular fixed frame 310 at a corresponding cylinder connecting region 320 aligned with a cylinder centerline 322 extending between the cylinder connecting region 320 and the cylinder 314. For each hydraulic actuator 308, the piston centerline 318 and the cylinder centerline 322 are aligned along a common axis shown by the dashed line during rotation of the one or more connecting rings 306. Furthermore, each hydraulic actuator 308 forms an angular relationship with a neighboring hydraulic actuator 308 shown as $\theta_1$, $\theta_2$, . . . and $\theta_i$ generally. Wherein due to said eccentric relationship between the crank shaft 304 and the connecting ring 306 each aligned piston centerline 318—cylinder centerline 322 of each hydraulic actuator 308 pivotally forms an angular relationship with respect to another aligned piston centerline 318—cylinder centerline 322 of a neighboring hydraulic actuator 308 thus forming a plurality of angular relationships $\theta_1$, $\theta_2$, . . . and $\theta_i$ generally between each two neighboring hydraulic actuators 308, wherein each member of said plurality of angular relationships continuously varies as the crank shaft 304 rotates.

Figure 4A:
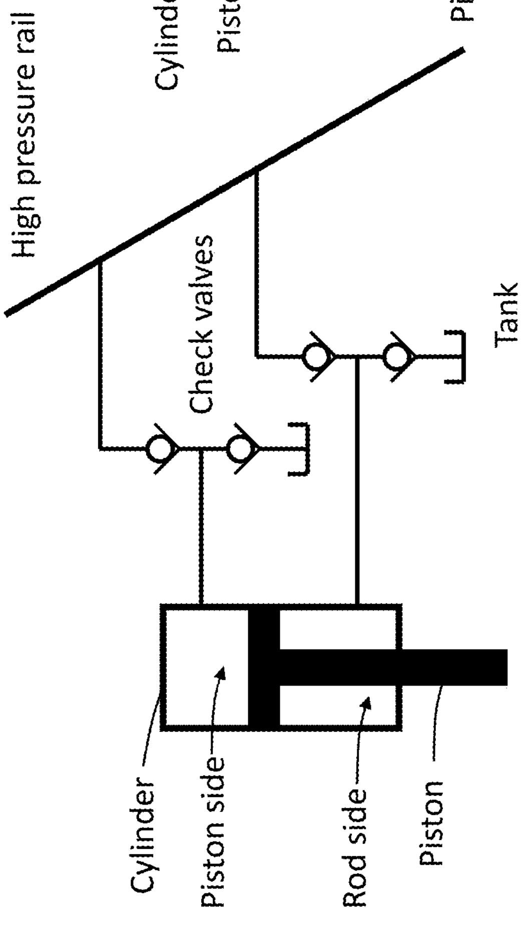
FIG. 4*a* is a schematic of a double-action piston cylinder arrangement representing one or more of the plurality of hydraulic actuators of FIG. 3.
Figure 4B:
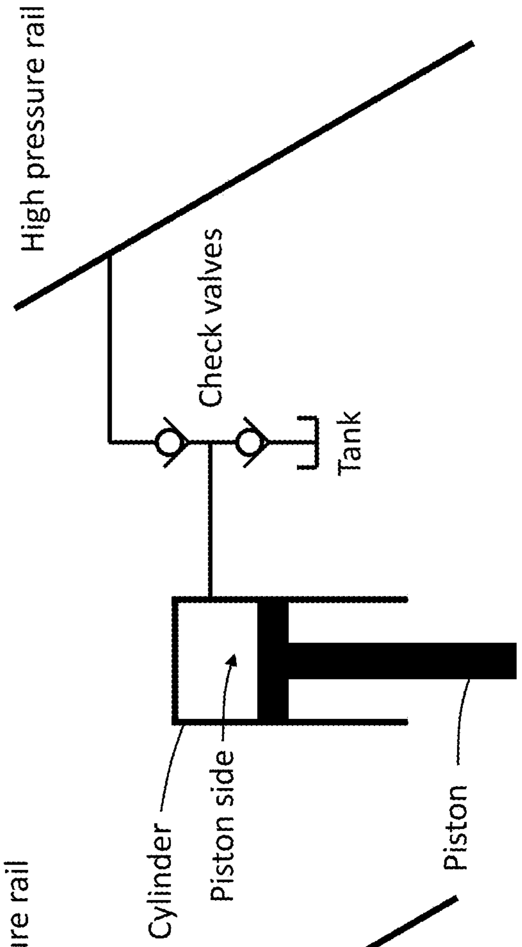
FIG. 4*b* is a schematic of a single-action piston cylinder arrangement representing one or more of the plurality of hydraulic actuators of FIG. 3.

To better elucidate the hydraulic circuit of FIG. 2, reference is made to FIGS. 4*a* and 4*b* which are schematics showing fluid circuits between each of the hydraulic actuators of FIG. 3 and a fluid reservoir. Referring to FIGS. 4*a* and 4*b*, two types of hydraulic actuators 308 (see FIG. 3) can be utilized in the presented hydrostatic drivetrain of the present disclosure. FIG. 4*a* shows a configuration similar to asymmetric hydraulic cylinders, known to a person having ordinary skill in the art. Each piston cylinder assembly encloses two control volumes, denoted as a piston side and a rod side. When the piston moves from its outer dead center to the inner dead center, the piston side volume decreases to achieve pumping action and the rod side expands to replenish working fluid, and vice versa. The check valves shown in FIG. 4*a* ensure proper flow of fluid from the cylinder. FIG. 4*b* shows a configuration similar to a conventional piston type hydraulic pumps and motors, where the piston cylinder assembly only encloses one volume, denoted as a piston side. In this configuration during the pressurization cycle, the piston side constitutes an output coupled to a high-pressure common rail via a first check valve; and during the depressurization cycle, the piston side constitutes an input coupled to a low-pressure reservoir via a second check valve. In both configurations, the connection of the enclosed volume(s) to the high-pressure and low-pressure reservoir can be controlled by on-off valves (e.g., check valves); however, both actively controlled valves or positively controlled valves can be used. Actively controlled on-off valve can also disconnect one or more piston cylinder assemblies from the overall system to change the overall flow to rpm ratio of the pump, and to allow continuous operation even if one or more of the cylinder assemblies fail.

Each hydraulic actuator 308 of FIG. 3 includes a low-pressure inlet and a high-pressure outlet. Using a plurality of check valves in the hydraulic circuit, as for example shown in FIGS. 4*a* and 4*b*, a high-pressure side (e.g., a high-pressure common rail) is hydraulically decoupled form a low-pressure side (e.g., a reservoir or a tank).

Figure 5:
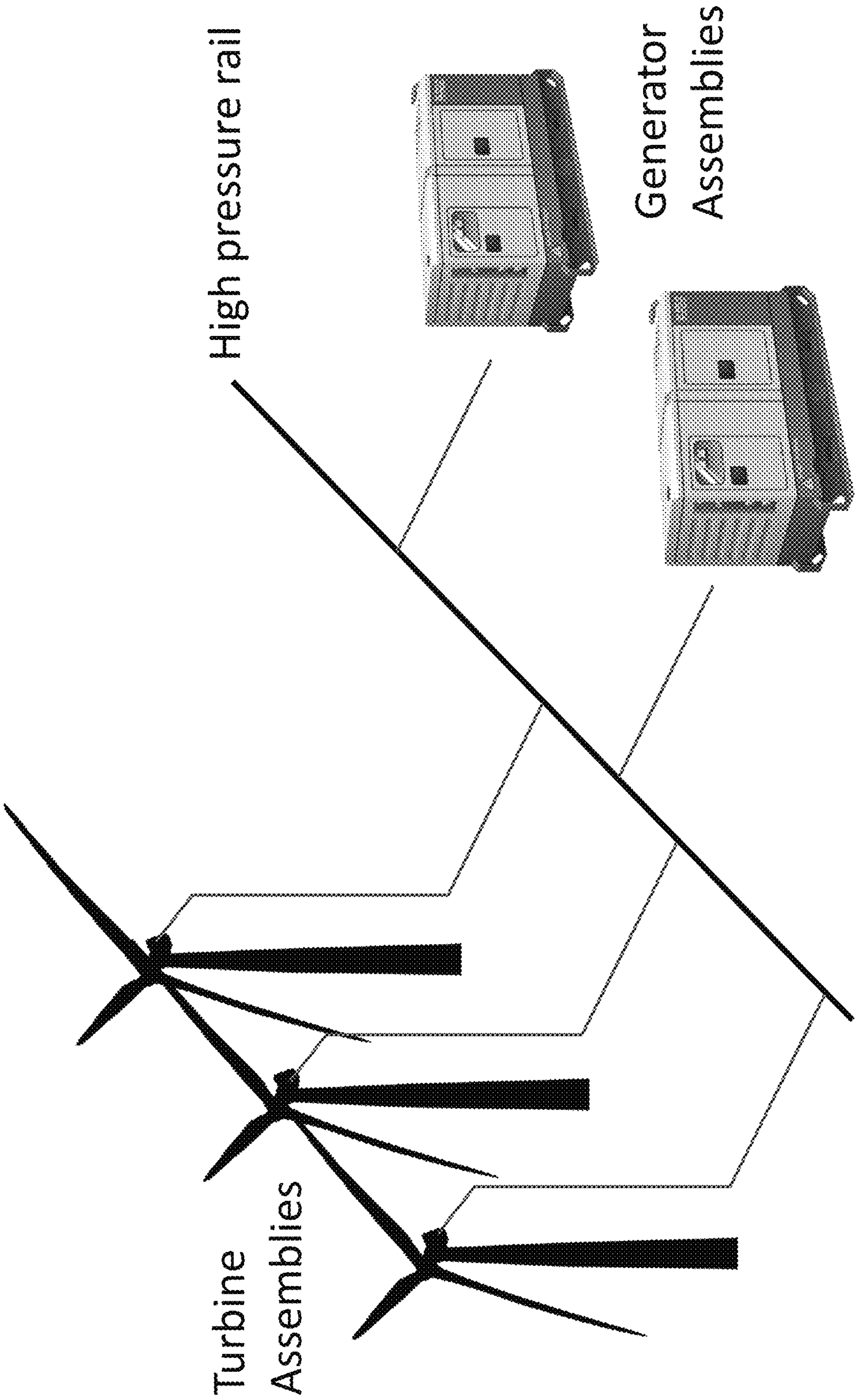
FIG. 5 is schematic of one or more turbine assemblies, each having a wind turbine coupled to a hydraulic pump coupled to a high pressure rail, and one or more generator assemblies each having a hydraulic motor coupled to the high pressure rail and generator coupled to an associated hydraulic motor.

Using this approach a circuit of turbines can be interconnected which improves efficiency significantly. Referring to FIG. 5, a schematic of a network of one or more turbine assemblies is provided, where each turbine assembly includes a wind turbine and a hydraulic pump which is hydraulically coupled to a high-pressure common rail. The network further includes one or more generator assemblies, each including a hydraulic motor coupled to the high-pressure rail and a generator coupled to the hydraulic motor. The generator assemblies can be consolidated into larger generators and hydraulic motors, rather than one per turbine assembly.

The number of hydraulic actuator 308 (see FIG. 3) according to the present disclosure can vary from 7 to 27, in that too low of a number will result in issues with flow ripple, and too high a number will increase the cost and may over stress the interface between the crank shaft 304 (see FIG. 3) and the connecting ring 306 (see FIG. 3).

The high-pressure common rail pressure is dependent on the type of fluid used. For example, if hydraulic oil is used, the pressure can be between about 100 to about 500 bar. If, however, water is used, the current water hydraulic technology has an operating pressure of between about 100 to about 500 bar. Using the technology described herein, and utilizing robust sealing with the piston ring, about 400 bar is feasible even with water as the working fluid. Therefore, the high-pressure common rail is configured to be between 100 and 500 bar.

While the hydraulic motor is not discussed outside of FIG. 2, since the proposed arrangement provides a streamlined output in the form of a high-pressure common rail, that rail can be used as input using a variety of different hydraulic motors, known to a person having ordinary skill in the art.

The eccentricity described herein provides a crucial role in the system of the present disclosure. Eccentricity manifests as the maximum distance between the centerline of the crank shaft and the centerline of the connecting ring. The eccentricity is expressed as a percentage defined as the delta movement of the connecting ring 306 (see FIG. 3) in the vertical direction divided by the connecting ring diameter, which ranges from about 2% to about 10%.

It should be appreciated that while wind turbines are discussed herein, the powertrain arrangement discussed herein is also capable of interfacing with hydro turbines or other power generating systems.

Those having ordinary skill in the art will recognize that numerous modifications can be made to the specific implementations described above. The implementations should not be limited to the particular limitations described. Other implementations may be possible.

The invention claimed is:

1. A camless low-speed high-torque hydrostatic powertrain, comprising:

one or more hydraulic pumps, each comprising:

an input crank shaft;

one or more connecting rings coupled to the input crank shaft with an eccentric interface such that when the input crank shaft is rotating causes the one or more connecting rings to rotate with an eccentricity;

an annular frame; and a plurality of hydraulic actuators annularly disposed between the one or more connecting rings and the annular frame, each hydraulic actuator of the plurality of hydraulic actuators having a piston disposed within a corresponding cylinder and pivotally connected to the one or more connecting rings at a corresponding piston connecting region aligned with a piston centerline extending between the piston connecting region and the piston and each corresponding cylinder pivotally connected to the annular frame at a corresponding cylinder connecting region aligned with a cylinder centerline extending between the cylinder connecting region and the cylinder and each hydraulic actuator further including a hydraulic input and a hydraulic output, wherein for each hydraulic actuator the piston centerline and the cylinder centerline are aligned along a common axis during rotation of the one or more connecting rings, and wherein due to said eccentric interface each aligned piston centerline—cylinder centerline of each hydraulic actuator pivotally forms an angular relationship with respect to an aligned piston centerline—cylinder centerline of a neighboring hydraulic actuator of the plurality of hydraulic actuators thus forming a plurality of angular relationships between each two neighboring hydraulic actuators, wherein each member of said plurality of angular relationships continuously varies as the input crank shaft rotates;

the eccentricity between the one or more connecting rings and the input crank shaft causes the plurality of hydraulic actuators to i) pump hydraulic fluid out of the hydraulic output, or ii) cause suction of hydraulic fluid from the hydraulic input;

one or more hydraulic motors hydraulically coupled to the hydraulic outputs of the one or more hydraulic pumps; and one or more generators coupled to the one or more hydraulic motors and configured to generate electrical power.

2. The powertrain of claim 1, wherein the input crank shaft configured to be interfaced with a shaft of a wind turbine or a hydro turbine.

3. The powertrain of claim 1, wherein the hydraulic fluid is water, and wherein the pressure of the hydraulic output is between about 100 bar and about 500 bar.

4. The powertrain of claim 1, wherein the hydraulic fluid is hydraulic oil, and wherein the pressure of the hydraulic output is between about 100 bar and about 500 bar.

5. The powertrain of claim 1, wherein the hydraulic output of each hydraulic actuator of the plurality of hydraulic actuators is coupled to a high-pressure common rail.

6. The powertrain of claim 5, wherein the hydraulic input of each hydraulic actuators of the plurality of hydraulic actuators is coupled to a low-pressure reservoir.

7. The powertrain of claim 6, wherein each of the one or more hydraulic pumps is coupled to a corresponding turbine.

8. The powertrain of claim 1, wherein the plurality of hydraulic actuators number between about 7 and about 27.

9. The powertrain of claim 1, wherein the eccentricity between the one or more connecting rings and the input crank shaft is expressed as a percentage of the difference between travel of the one or more connecting rings along a first direction divided by diameter of the one or more connecting rings, and the eccentricity is between about 2% and about 10%.

10. The powertrain of claim 1, wherein one or more of the plurality of hydraulic actuators is configured to have a piston side within the cylinder and a rod side within the cylinder, wherein each cylinder of the plurality of hydraulic actuators is coupled to the annular frame.

11. The powertrain of claim 10, wherein the piston side i) during an outer dead center cycle constitutes an output of the hydraulic actuator coupled to a high-pressure common rail via a check valve, and ii) during an inner dead center cycle constitutes an input of the hydraulic actuator coupled to a low-pressure reservoir via a check valve.

12. The powertrain of claim 10, wherein the rod side i) during an outer dead center cycle constitutes an input of the hydraulic actuator coupled to a low-pressure reservoir via a check valve, and ii) during an inner dead center cycle constitutes an output of the hydraulic actuator coupled to a high-pressure common rail via a check valve.

13. The powertrain of claim 1, wherein one or more of the plurality of hydraulic actuators is configured to have a piston side within the cylinder, wherein each cylinder of the plurality of hydraulic actuators is coupled to i) the annular frame; or ii) the one or more connecting rings.

14. The powertrain of claim 13, wherein the piston side i) during a pressurization cycle constitutes an output of the hydraulic actuator coupled to a high-pressure common rail via a check valve, and ii) during a depressurization cycle constitutes an input of the hydraulic actuator coupled to a low-pressure reservoir via a check valve.

* * * * *